US006710327B2

(12) United States Patent
Arshad et al.

(10) Patent No.: US 6,710,327 B2
(45) Date of Patent: Mar. 23, 2004

(54) MULTI-FIBER MULTI-CYLINDER POSITION METHOD AND APPARATUS USING TIME-OF-FLIGHT TECHNIQUE

(75) Inventors: Mohammad Javaid Arshad, Naperville, IL (US); Alan D. Berger, Winfield, IL (US); Daniel L. Maierhafer, Seneca, SC (US); Danley C. Chan, Chicago, IL (US)

(73) Assignee: Case, LLC, Racine, WI (US)

( * ) Notice: Subject to any disclaimer, the term of this patent is extended or adjusted under 35 U.S.C. 154(b) by 78 days.

(21) Appl. No.: 09/872,895

(22) Filed: Jun. 4, 2001

(65) Prior Publication Data

US 2002/0179824 A1 Dec. 5, 2002

(51) Int. Cl.[7] .............................. G01J 1/04; F01B 21/00
(52) U.S. Cl. ...................................... 250/227.11; 92/5 R
(58) Field of Search ........................ 250/227.11, 227.14, 250/227.21, 227.28, 214 A, 214 R, 559.27, 559.32; 92/5 R; 91/1; 324/637, 642, 644

(56) References Cited

U.S. PATENT DOCUMENTS 6,005,395 A 12/1999 Chan et al.
6,267,942 B1 * 7/2001 Mori et al. .................... 92/5 R
6,484,620 B2 * 11/2002 Arshad et al. ................ 92/5 R

OTHER PUBLICATIONS

U.S. Ser. No. 09/750,866, filed Dec. 28, 2000 entitled "Laser Based Reflective Beam Cylinder Sensor", Inventors: M. Javid Arshad; Alan D. Berger and Dan Chan.
U.S. Ser. No. 09/872,874 filed Jun. 4, 2001 entitled "Multi–Fiber Cylinder Position Sensor Using Time–of–Flight Technique", Inventors: Mohammad J. Arshad; Daniel L. Maierhafer and Alan D. Berger.

* cited by examiner

*Primary Examiner*—Kevin Pyo
(74) *Attorney, Agent, or Firm*—Rebecca Henkel; Brant T. Maurer

(57) ABSTRACT

A hydraulic actuator is disclosed having a cylinder with a piston that is moved by hydraulic fluid. A laser diode emits a pulse or pulses of light that form laser light beam. These pulses are provided to two or more optical fibers that extend into two or more corresponding cylinders. For each of these cylinders, the optical fiber enters the cylinder at one end of the cylinder and directs a laser beam into the cylinder, and off the piston where the beam is reflected. The reflected beam then exits the cylinder through at least two corresponding optical fibers disposed on either side of the fiber that conducted the light into the cylinder. Each of the optical fibers that receives reflected light is joined together with the others of the optical fibers into one fiber that carries the reflected beam of light to a photo-diode located remote from the cylinder. Each of the photo diodes for each of the two or more cylinders has a corresponding photo diode amplifier. The output of these amplifiers are coupled together and provided to a pulse expansion circuit. The timing circuit that generates the pulse that triggers the laser diode also generates gate pulses for each of the photo diode amplifiers. These gate signals suppress the output of all but one of the photo diode amplifiers. In this manner, the pulse expansion circuit and phase comparator circuits that receive the photo diode amplifier signals will generate an output signal indicative of the time-of-flight of the laser light pulse in only one cylinder at a time. This permits the system to select a specific cylinder and generate a signal indicative of the position of the piston within the cylinder: the time-of-flight of the laser light pulse.

19 Claims, 4 Drawing Sheets

MULTI-FIBER MULTI-CYLINDER POSITION METHOD AND APPARATUS USING TIME-OF-FLIGHT TECHNIQUE

FIELD OF THE INVENTION

The invention relates generally to position sensing of hydraulic and pneumatic actuators. More particularly, it relates to sensing using laser light sources and detectors and determining the position of the actuator using time-of-flight algorithms.

BACKGROUND OF THE INVENTION

Position sensing for hydraulic or pneumatic actuators typically uses an external position sensor, such as a rotary rheostat or potentiometer. Alternatively, linear rheostats or variable differential transformers are employed. These systems suffer from poor accuracy, extensive wear, and fragility in many applications, especially demanding applications such as their use on work and agricultural vehicles.

These sensors are quite susceptible to damage, and suffer from being damaged during vehicle operation, or from the extremes in temperature that work and agricultural vehicles face.

In an effort to solve these problems, new methods of measuring the position of a hydraulic or pneumatic actuator have been devised that use microwaves. These waves are transmitted from one end of the cylinder, reflect off the piston, and return to a detector. By measuring the time-of-flight of these waves, the location of the piston can be determined. Such an example is shown in U.S. Pat. No. 6,005,395, which is incorporated herein by reference for all that it teaches.

The microwave transmitter suffers from high cost and difficulties in determining which of the many reflections in the cylinder is the proper one to measure.

In an alternative system, the pulse generating and timing circuits of U.S. Pat. No. 6,005,395 are used, but are coupled to a laser light source and respond to a reflection of that beam against a laser light detector, such as that shown in co-pending U.S. patent application Ser. No. 09/750,866.

This arrangement also has drawbacks. When the piston moves toward or away from the source and detector, the reflected light follows multiple paths that, like the microwave transmitter and receiver pair, make the reflected pulses difficult to interpret. It is difficult to extract a good pulse indicative the precise time-of-flight of the laser beam.

An improvement on this system is provided in our co-pending application entitled "MULTI-FIBER CYLINDER POSITION SENSOR USING TIME-OF-FLIGHT TECHNIQUE", docket number 13936 and filed contemporaneously herewith. In that application, a single optical fiber transmits laser-light pulses from outside a hydraulic or pneumatic cylinder to inside the cylinder. The fiber is preferably located along a central longitudinal axis of the cylinder. The light pulses from the transmitting fiber travel down the cylinder substantially parallel to the longitudinal axis of the cylinder and reflect off the face of the piston in the cylinder. The light is reflected straight back toward the transmitting fiber. The path it follows in returning to the transmitting fiber at the end of the cylinder is substantially the same path as the path it traveled when going from the fiber to the piston. In short, the laser beam is preferably normal to the piston where it is reflected in order to provide these parallel in and out paths. When the laser light pulses return to the region of the transmitting fiber, they fall on the free ends of several optical fibers disposed around the central transmitting fiber. All of these fibers receive the light pulses at substantially the same time and conduct the light pulse from inside the cylinder to outside the cylinder. The receiving fibers are closely spaced in a circular arrangement equidistant from the central fiber. Since the light pulse from the central fiber follows the same path back after reflecting from the piston, each of the fibers receives approximately the same amount of light energy, and receives it at almost exactly the same time.

The distal ends of the receiving fibers are coupled together such that each portion of the reflected light pulse that each individual fiber of the receiving fiber carries are merged to form a much stronger light pulse. The lengths of the receiving optical fibers are chosen such that the portions of the reflected light pulse that each one carries is merged into a single pulse at exactly the same time. This sharply increases the magnitude of the resulting pulse and provides an extremely fast and sharp rise time. In this manner, a reflected light pulse can be "reassembled" with a very sharp leading edge that permits precise time-of-flight measurements.

The system described in the foregoing patent application, however, discloses a separate laser diode and separate photodiode for use with a single cylinder. In addition, there is complex and expensive circuitry to expand the light pulse and compare the phases of the transmit and receive pulses to determine the time-of-flight in a cylinder, and thereby the position of the piston within the cylinder.

Duplicating this structure in a vehicle that has several hydraulic or pneumatic cylinders would be prohibitively expensive. Multiplying the arrangement of the 13936 application would require as many laser diodes, photodiodes, amplifier circuits, pulse expansion circuits and phase comparators as there are individual cylinders. What is needed, therefore, is a system that can measure the position of several hydraulic cylinders, yet does not require duplicate sets of circuitry for each of those cylinders. It is an object of this invention to provide such a system.

SUMMARY OF THE INVENTION

In accordance with a first embodiment of the invention, a multiple cylinder position sensing system is provided that includes a first cylinder including a first source light guide having a first end and a distal second end and extending from inside the cylinder to outside the cylinder and adapted to transmit at least a first beam of laser light at a first frequency from outside the cylinder to inside the cylinder, and at least one first reflected light guide having a first end and a distal second end and extending from inside the cylinder to outside the cylinder and configured to receive light from the first beam of laser light that is reflected off the inside of the first cylinder, and a second cylinder including a second source light guide having a first end and a distal second end and extending from inside the cylinder to outside the cylinder and adapted to transmit at least a second beam of laser light at a first frequency from outside the cylinder to inside the cylinder, and at least one second reflected light guide having a first end and a second end and extending from inside the cylinder to outside the cylinder and configured to receive light from the second beam of laser light that is reflected off the inside of the second cylinder.

The system may include a laser light source that is optically coupled to the distal ends of both the first and second source light guides, and configured to generate a source beam of laser light, wherein the source beam is divided into the first and second beams of laser light. The system may include a first photodiode configured to receive and electrically respond to light from the first beam of laser light that is reflected off the inside of the first cylinder from the first reflected light guide. The system may also include a laser light source driver circuit coupled to the laser light source and configured to energize the laser light source upon receipt of a trigger pulse, and a timing circuit coupled to the laser light source driver configured to generate the trigger pulse and apply the trigger pulse to the laser light source driver circuit. The laser light source may be a laser diode. The system may include first and second photodiode amplifiers that are coupled to the first and second photodiodes, respectively.

Each of the first and second photodiode amplifiers may be configured to generate an output signal.

The system may also include a pulse expansion circuit, to which the first and second photodiode output signals are coupled.

The second ends of the plurality of second light guides may be optically coupled to a single light detector. The light detector may have an electrical output that is produced by light carried by at least two of the plurality of second light guides.

In accordance with a second embodiment of the invention, a method for determining the time-of-flight of laser light pulses in a plurality of hydraulic or pneumatic cylinders is provided, including the steps of generating a timing pulse in a timing circuit, conducting the timing pulse to a laser light source and responsively generating laser light pulse from the source, conducting a first portion of the pulse through a first optical fiber to a first cylinder, conducting the first portion into the first cylinder, reflecting the first portion off a first reflective surface coupled to a first piston in the first cylinder, receiving the first portion at a first photo diode and responsively generating a first electrical signal, conducting a second portion of the pulse through a second optical fiber to a second cylinder, conducting the second portion into the second cylinder, reflecting a second portion off a second reflective surface coupled to a second piston in the second cylinder, receiving the second portion at a second photo diode and suppressing the generation of the second electrical signal, providing the first electrical signal and the timing pulse to a comparator circuit and responsibly generating a first output signal indicative of a first time difference between the arrival of the timing pulse and the arrival of the first electrical signal at the comparator circuit.

The method may also include the steps of generating a second timing pulse in the timing circuit, conducting the second pulse to the laser light source and responsibly generating a second laser light pulse from the source, conducting a first portion of the second laser light pulse through the first optical fiber to the first cylinder, conducting the first portion of the second laser light pulse into the first cylinder, reflecting the first portion of the second laser light pulse off the first reflective surface, receiving the first portion of the second laser light pulse at the first photo diode and suppressing the generation of a third electrical signal indicative of the time of arrival of the first portion of the second laser light pulse at the first photo diode, conducting a second portion of the second laser light pulse through the second optical fiber to the second cylinder, conducting the second portion of the second laser light pulse into the second cylinder, reflecting the second portion of the second laser light pulse off the second reflective surface, receiving the second portion of the second laser light pulse at a second photo diode and responsibly generating a fourth electrical signal indicative of the time of arrival of the second portion of the second laser light pulse at the second photo diode, providing the fourth electrical signal in the second timing pulse to the comparator circuit and responsibly generating a second output signal indicative of a second time difference between the arrival of the timing pulse and the second electrical signal at the comparator circuit.

The step of conducting the first timing pulse to the laser light source and responsively generating a second laser light pulse from the source may include the steps of optically coupling the laser light source to distal ends of the first and second optical fibers, and dividing the first laser light pulse into the first and second portions. The method may also include the steps of providing a laser light source driver circuit, coupling the laser light source to the driver circuit, applying the first and second timing pulses to the laser light source driver circuit, and energizing the laser light source responsive to the application of the first and second timing pulses to the driver circuit. The method may include the steps of providing a first photo diode amplifier and coupling the first photo diode amplifier to the first photo diode, providing a second photo diode amplifier and coupling the second photo diode amplifier to the second photo diode, generating a first gate signal in the timing circuit, applying the first gate signal to the first photo diode amplifier to permit the transmission of first electrical signal, generating a second gate signal in the timing circuit, and applying the second gate signal to the second photo diode amplifier to suppress the transmission of the second electrical signal. The method may include the step of configuring the first and second photo diode amplifiers to generate first and second amplifier output signals, respectively. The method may include the step of coupling the first and second photo diode amplifier output signals and transmitting the coupled output signals to a pulse expansion circuit. The method may include the step of transmitting the first and second output signals to a pulse expansion circuit. The method may include the steps of generating an expanded pulse output signal in the pulse expansion circuit, and outputting the expanded pulse output signal from the pulse expansion circuit. The method may include the steps of providing a pulse comparator circuit, and inputting the expanded pulse output signal and the timing pulse into the pulse comparator circuit, and generating a time delay output signal in the pulse comparator circuit indicative of a time delay between the timing pulse and the expanded pulse output signal.

In accordance with a third embodiment of the invention, a method of determining the time-of-flight of laser light in a plurality of hydraulic or pneumatic cylinders includes the steps of transmitting a laser light pulse from a laser diode, dividing the laser light pulse into at least first and second sub-pulses, injecting the first and second sub-pulses into first and second cylinders, respectively, reflecting the first and second sub-pulses off first and second pistons in the first and second cylinders, respectively, transmitting the first and second reflected sub-pulses at two first and second photo diodes, respectively, generating first and second electrical signals in the first and second photo diodes that are indicative of the first and second times of arrival of the first and second sub-pulses at the first and second photo diodes, respectively, selectively coupling the first and second electrical signals in a first mode of operation to a pulse expansion circuit and a phase comparator circuit to generate a first time-of-flight signal on an output line of the phase comparator circuit that is indicative of the time-of-flight of the first sub-pulse and not of the second sub-pulse, repeating the foregoing steps with a second pulse of laser light, but in a second mode of operation wherein the phase comparator circuit generates a second time-of-flight signal on the output line that is indicative of the time-of-flight of the second sub-pulse and not of the first sub-pulse of the second pulse of laser light.

BRIEF DESCRIPTION OF THE DRAWINGS

The present invention will become more fully understood from the following detailed description, taken in conjunction with the accompanying drawings, wherein like reference numerals refer to like parts, in which.

DETAILED DESCRIPTION OF THE PREFERRED EMBODIMENT

Figure 1:
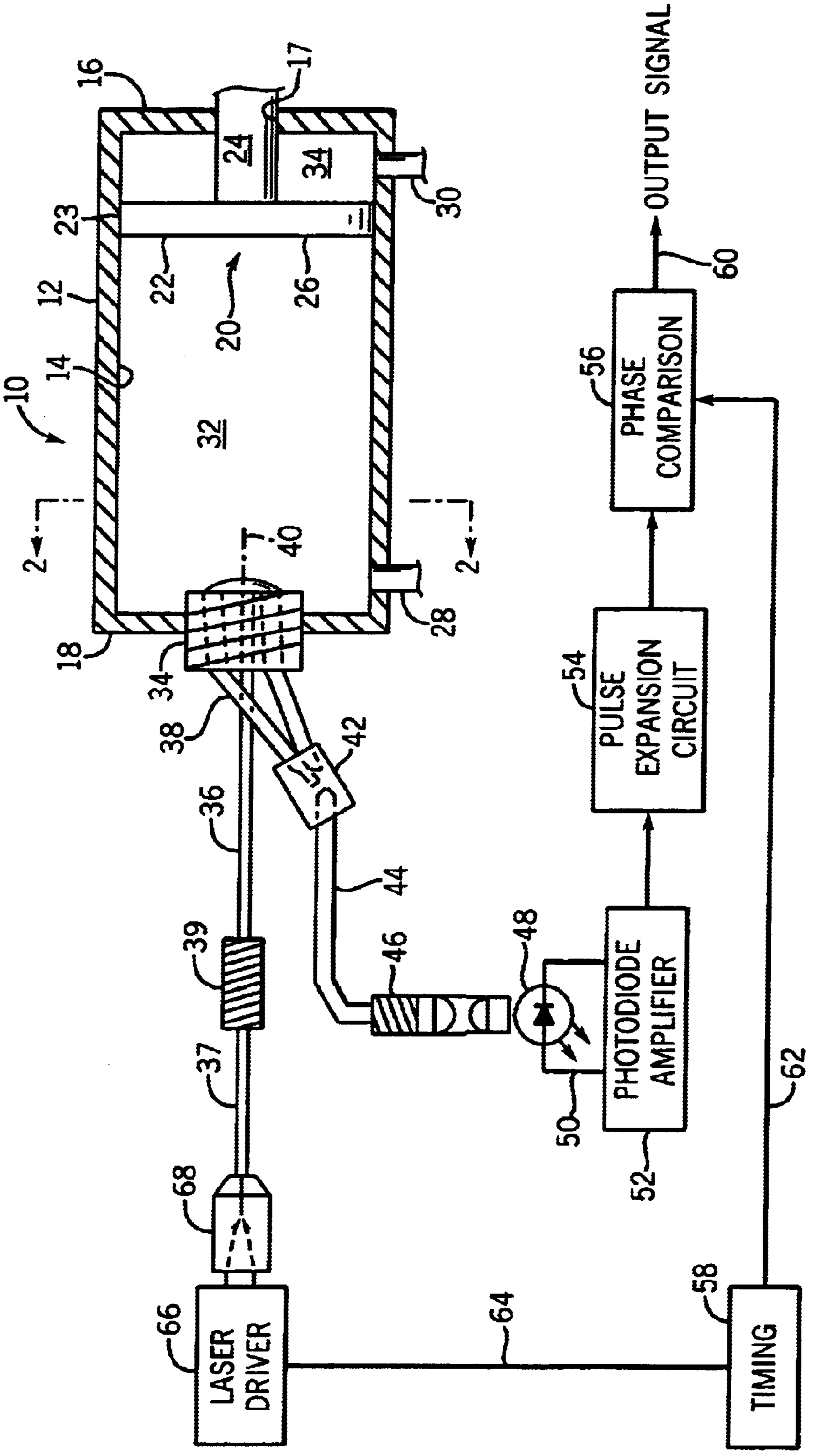
FIG. 1 is a partial cross-sectional view of a hydraulic actuator having the laser-based reflective beam sensor and a control unit for generating the laser beam and calculating the position of the actuator wherein the laser light sources are located remotely from the actuator and cables including three fiber optic light guides couple the control unit to the actuator.

FIG. 1 is a schematic view of a linear cylindrical actuator 10 in accordance with the present invention. Actuator 10 includes a cylinder 12 having an inner diameter 14 and two end caps 16, 18. Rod end cap 16 encloses one longitudinal end of the cylinder and has an opening 17 through which rod 24 passes. Opening 17 seals against the surface of the rod and prevents actuating fluid from leaking out. End cap 18 encloses the opposing end of the cylindrical potion of the cylinder and prevents actuating fluid from leaking out.

Actuator 10 also includes a piston assembly 20 which includes a piston 22 having an outside diameter 23 configured to seal against the inner diameter 14 of the cylinder and to slide longitudinally, back and forth, with respect to cylinder 12. Piston 22 is coupled to rod 24, which extends from the inside of the cylinder to the outside of the cylinder through opening 17 and is fixed to piston 22 to move simultaneously with the piston. Surface 26 is a reflective surface fixed to move with piston 22 and is configured to reflect laser light that is introduced into the cylinder. Two ports 28, 30 are provided in the cylinder to introduce an operating fluid into the cylinder or remove the operating fluid from the cylinder. Extension cylinder port 28 is disposed in the cylinder such that fluid introduced into the port will cause the piston and piston rod to move in a direction that increases the overall length of the actuator 10. Retraction cylinder port 30 is disposed in the cylinder such that when a working fluid is introduced into the actuator through this port, it causes the piston assembly to move into the cylinder, or retract, thereby reducing the overall length of actuator 10. When the working fluid is removed from retraction cylinder port 30, rod 24 extends farther outside the cylinder, increasing the overall length of actuator 10.

The cylinder and piston assembly collectively define two internal cavities separated by the piston into which fluid may be introduced or removed. Extension cavity 32, when filled (through port 28) causes the piston assembly to extend, increasing the overall length of the actuator. At the same time, retraction cavity 34 is emptied. Similarly, when retraction cavity 34 is filled, through retraction cylinder port 30, retraction cavity 34 fills with fluid, extension cavity 32 empties fluid through extension cylinder port 28.

Excluding the effects due to the size of piston rod 24, actuator 10 has a predetermined internal fluid volume that does not change based upon the position of the piston. This volume (again, discarding the effects due to the size of piston rod 24) is equal to the sum of the volumes of extension cavity 32 and retraction cavity 34.

Figure 2:
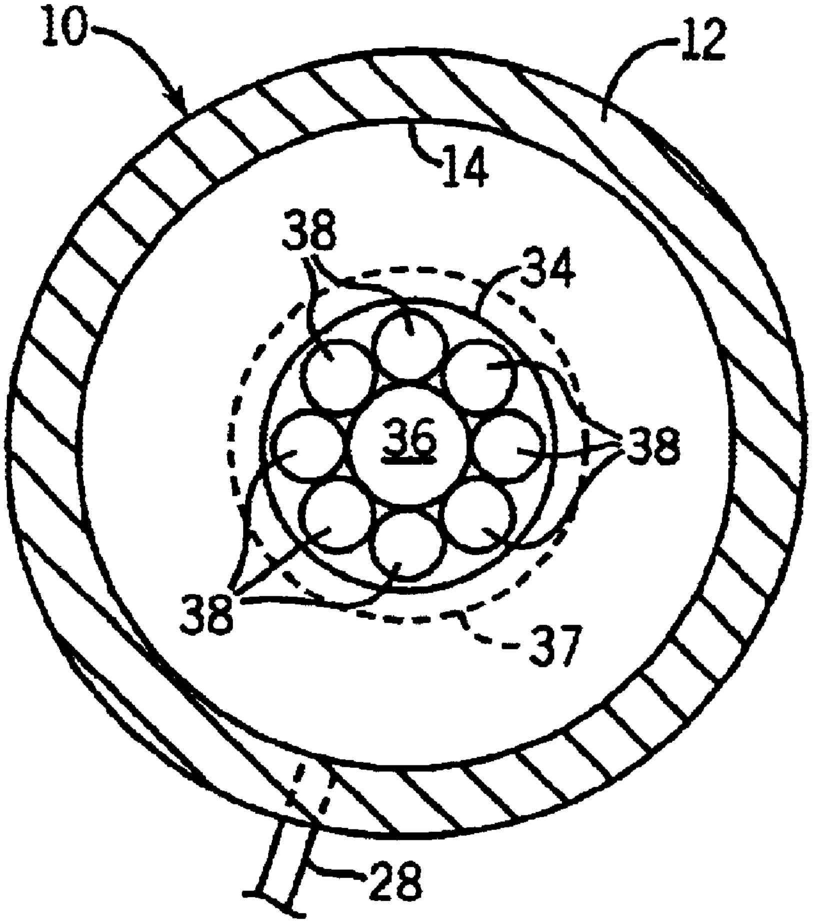
FIG. 2 is a partial cross-sectional view of the embodiment of FIG. 1 showing how the light guides are coupled to the cylinder.

An optical coupler 34 is fixed in end cap 18 to communicate laser light into chamber 32 and to communicate laser light from chamber 32 outside the cylinder. The cap itself has a threaded external surface that engages mating threads in end cap 18. These threads serve to secure the coupler to the end cap and to prevent leakage of hydraulic fluid or air out of the cylinder. The coupler also serves to hold several optical fibers 36, 38 in a fixed relationship with respect to cylinder 12. Coupler 34 is preferably disposed along the centerline of cylinder 12 such that the cylinder and the coupler share a common cylindrical axis 40. Referring now to FIG. 2, coupler 34 supports eight optical fibers ranged in arcuate, preferably circular, pattern equidistantly spaced from the longitudinal cylindrical axis of the coupler. These fibers gather light that is reflected off surface 26 and conduct it out of the cylinder. Fiber 36 is disposed along axis 40 and conducts light from outside the cylinder into the cylinder. Light that is conducted into the cylinder through fiber 36 is directed towards reflective surface 26 on piston 22. It reflects off piston 22 and returns in a plurality of paths to each of optical fibers 38. These fibers receive the light at substantially the same time and conduct the light out of the cylinder. An optical combiner 42 is optically coupled to fibers 38 and joins their/there individual light beams into a single beam that exits combiner 42 in optical fiber 44. Thus, the light carried by optical coupler 44 is the combination of all the individual beams of light carried by optical fibers 38.

Referring now to FIG. 1, optical fiber 44 is at its other end connected to optical coupler 46, which directs and focuses the light beam of fiber 44 to photodiode 48. When the light passes through coupler 46 and falls upon photodiode 48, it changes the conductivity of the photodiode causing a change in the current flowing through circuit 50. This change in current, or photodiode signal, is amplified by photodiode amplifier 52. The output of photodiode amplifier 52 is fed to pulse expansion circuit 54 which increases the width of the photodiode signal. Phase comparison circuit 56 receives two impulses: the expanded pulse from pulse expansion circuit 54 and a trigger pulse from timing circuit 58. By determining the time difference between the pulse of timing circuit 58 and the expanded pulse from circuit 54, phase comparison circuit 56 generates a signal indicative of the time delay between these two pulses. This time delay signal is output signal 60.

Timing circuit 58 generates periodic pulses on the order of once every tenth of a second. These two pulses are provided on two signal lines. Signal line 62, which goes to phase comparison circuit 56 and signal line 64, which goes to laser driver circuit 66. Laser driver circuit 66, when it receives this timing signal, generates a pulse that is applied to laser diode 68. Laser diode 68 turns the signal into a laser light pulse, which is transmitted through optical fiber 36 and coupler 34 into cylinder 12. The laser light pulse traverses cavity 32, reflects off surface 26 and returns to optical fibers 38, which are held in coupler 34.

Referring back to phase comparison circuit 56, circuit 56 receives a pulse on line 62 generated by timing circuit 58. It also receives an expanded pulse from pulse expansion circuit 54. The difference in time of arrival of these two pulses is substantially equal to the amount of time it takes for the laser light pulse to travel from laser diode 68 to photodiode 48. Whenever piston 20 moves, both the path from laser diode 68 to the piston increases and the path from the piston to photodiode 48 increases. Since this is a linear device, for every inch of movement of piston 20 the path length changes by two inches.

Pulse expansion circuit 54 is disclosed in more detail in U.S. Pat. No. 6,005,395 as the directional sampler 74. The output of pulse expansion circuit 54 is an equivalent-time replica of the reflected pulses received by photodiode 48.

Phase comparison circuit 56 is described in U.S. Pat. No. 6,005,395 as directional set/reset circuit 100.

The output signal 60 is preferably in the form of a square wave having a pulse width indicative of the time required for the light emitted from laser diode 68 to travel through the system. Changes in the pulse width are preferably proportional to the distance the piston has traveled.

Referring now to FIG. 2, we see a cross-section of the end of actuator 10 taken at Section 2—2 in FIG. 1. The coupler 34 is fixed to optical fibers 38 that transmit the reflected light beam out of the cylinder. In the embodiment shown, there are eight optical fibers arranged in a circular pattern about optical fiber 36, which is also supported in coupler 34. Coupler 34 is preferably disposed within the cylinder, as shown in FIG. 2, such that fiber 38 enters the cylinder substantially coaxial with longitudinal axis 40 of the cylinder. Each of the eight fibers 38 is preferably disposed equidistantly with respect to fiber 38 and is preferably spaced equidistantly apart from the others of fibers 38. In this manner, each fiber has a corresponding fiber disposed on the opposing side of optical fiber 38 from which they are both equally spaced.

In addition, the longitudinal axis of each of the optical fibers 38 and optical fiber 36 are preferably parallel such that light transmitted into the cylinder through optical fiber 36 will reflect off surface 26 of piston 20 and return directly to coupler 34. If surface 26 is disposed in a substantially perpendicular orientation with respect to the longitudinal axes of fibers 38 and 36, substantially all the light that is emitted into cylinder 12 by optical fiber 36 will arrive back at coupler 34.

The benefit of having several optical fibers for receiving reflected light is two fold. First, a smaller diameter optical fiber can be spaced closer to fiber 36. This closer spacing means that it is in a better position to receive the reflected light that reflects off perpendicular reflective surface 26. Secondly, by providing several optical fibers, considerably more reflected light can be gathered and provided to photodiode 48. This provides a substantially larger pulse and reduces any the possibility that stray reflections will trigger photodiode 48.

To provide this additive effect, each of optical fibers 38 is preferably the same length. Thus, when reflected light is received substantially simultaneously at each of the end of optical fibers 38 in cylinder 12, these pulses will take substantially the same time to arrive at combiner 42. Since each of fibers 38 are multiplexed together, the light in each fiber 38 will be added and inserted into optical fiber 44. Thus, any reflected light falling simultaneously on the receiving ends of fibers 38 will be combined and arrive simultaneously at the photodiode.

The spacing between fiber 36 and each of fiber 38 is preferably small, on the order of one to two centimeters. More preferably it is between five and ten millimeters.

Figure 3:
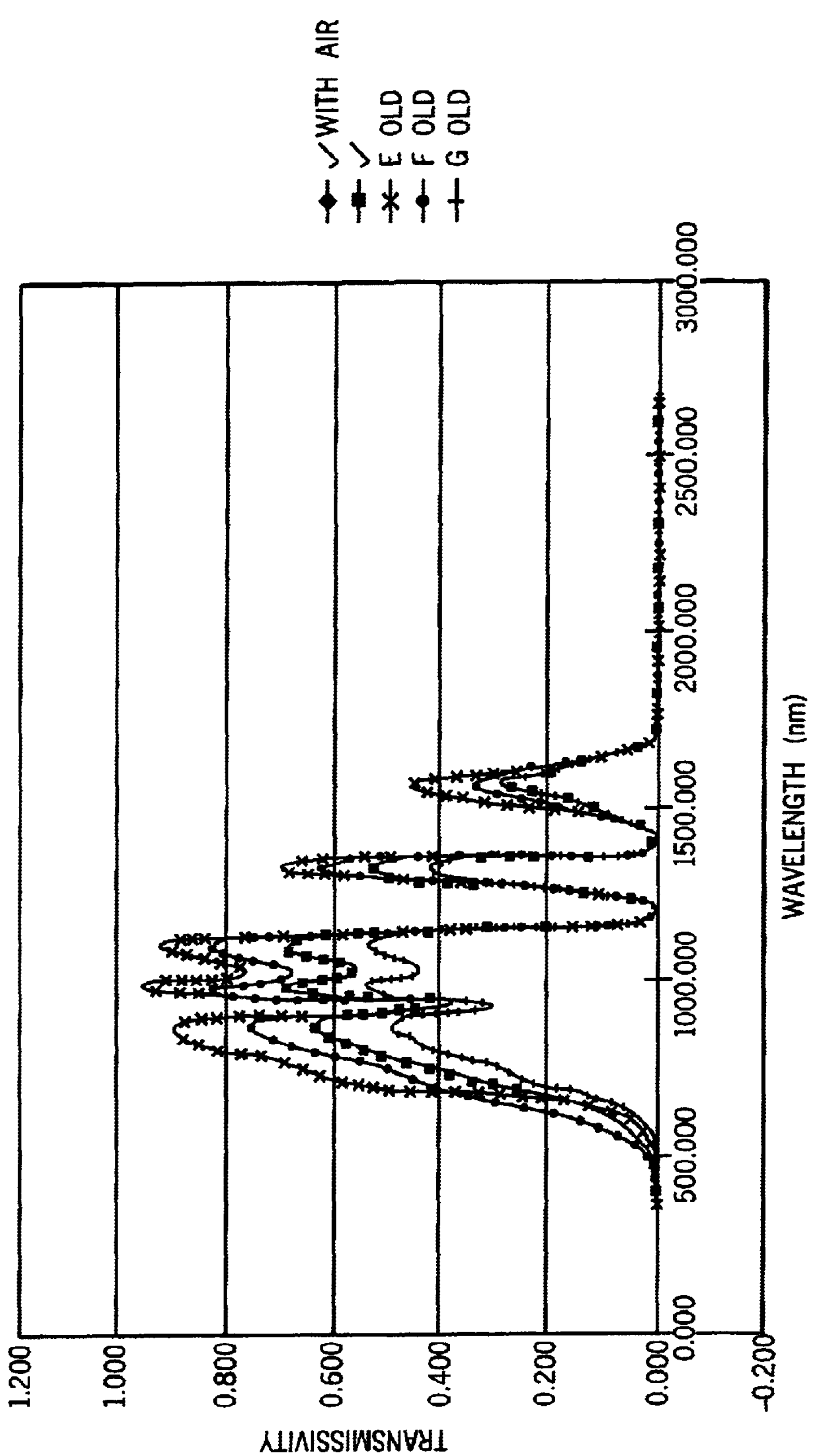
FIG. 3 is graph of laser light transmissivities through several different hydraulic fluids of various ages and types.

FIG. 3 is a plot of transmissivity vs. wavelength. It measures the degree to which laser light is attenuated as it passes through hydraulic fluids of varying types. The types of hydraulic fluid tested include "J" type fluid with in-trained air, "J" type fluid, old "E" type fluid, old "F" type fluid, and old "G" type fluid as shown in the legend in FIG. 3. These types of hydraulic fluid are well known to engineers working with hydraulic fluids, and represent several of the most common fluids used in hydraulic systems today. The "E", "F" and "G" type fluids are "old" in that the fluids tested have been used in actual hydraulic equipment, and were not new. Three of the four hydraulic fluids that make up the J, E, F and G fluids are Case hydraulic fluids MS 1207 Hi Tran Plus, MS 1209 Hi Tran Ultra, and MS 1230. The reason these fluids were chosen was to see the degree to which aging and use of a hydraulic fluid would cause the optical characteristics of such fluid to degrade. The assumption is that degraded or "old" fluid by its accumulation of moisture, oxygen, and suspended particulates such as metal particles would not transmit laser light as readily as new hydraulic fluids. The chart in FIG. 3 indicates the qualities of each of the aforementioned fluids. Note that the transmission of light is restricted almost entirely in the range of 500–1700 nanometers. Outside this range, there is virtually no transmission of light. Within this range, however, there are three separate sub-ranges in which a significant amount of light is transmitted. These ranges are 700–1150 nanometers, 1250–1400 nanometers, and 1450–1650 nanometers. The broadest of these three ranges is the band between 700 and 1150 nanometers. In this range, there are three significant sub-ranges in which transmissivity is substantial these include the sub-range of 700–900 nanometers, 950–1025 nanometers, and 1030–1150 nanometers. Each of these sub-bands has a local transmissivity maximum at 850, 970, and 1090 nanometers, respectively. The other two major bands have their respective maxima at 1315 nanometers and 1560 nanometers, respectively.

Note that, in comparing each of the hydraulic fluids, the peak transmissivities in each of the bands and sub-bands do not vary substantially from the peak transmissivities of the other peak transmissivities. Comparing the "G_old" to the "E_old" fluids, although the variations in transmissivity at each of their respective maxima varies from 0.1 (at 1090 nanometers) to 0.4 (at 850 nanometers), the wavelengths of these respective maxima are the same.

Based upon this empirical analysis, it is clear that as hydraulic fluid ages its transmissivity peaks do not shift. An appropriate high power laser diode for transmitting light through the hydraulic fluid would therefore be preferably selected to have a wavelength at or near any of the local maxima shown in FIG. 3. As that oil ages, and in the absence of any maxima wavelength shift, one would expect the transmissivity to drop, but not to shift radically based upon wavelength. For this reason, a laser diode having a frequency of 850, +80/−125 nanometers, 970+/−30 nanometers, or 1090+/−30 nanometers would be particularly preferred. While the other two major bands also exhibit strong transmissivity at their local maxima, due to the sudden and extreme drop-off on either side of the local maxima there less preferred. Nonetheless, even though they are less preferred, a laser diode having a wavelength of 1325, +/−50 nanometers, or 1560+/−50 nanometers would also be acceptable.

Figure 4:
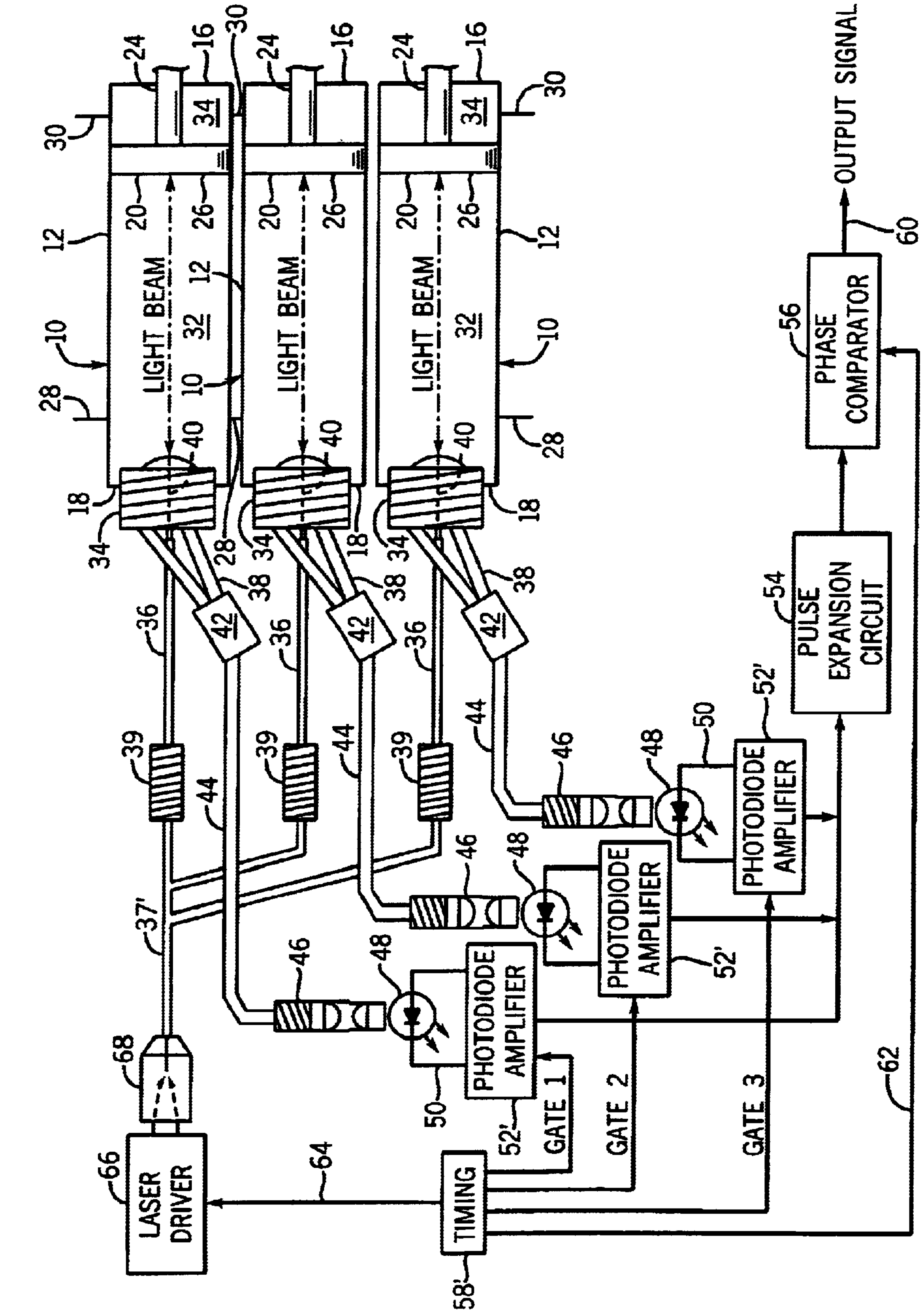
FIG. 4 illustrates an arrangement that includes several cylinders that are multiplexed together sharing common circuitry in accordance with the present invention.

FIG. 4 illustrates an arrangement of multiple hydraulic cylinders with laser light sensors that are connected to a single laser diode. This arrangement permits a plurality of hydraulic or pneumatic cylinders to be monitored by a single pulse expansion circuit and phase comparator circuit. There are similarities between the circuit of FIG. 1 as well as differences. First, we would like to discuss the similarities. The cylinders 10 are identical both in FIG. 1 and FIG. 4. The optical couplers 34 are also identical in both FIG. 1 and FIG. 4. The optical fibers and connectors extending from the cylinder to the photodiode amplifier are also identical in both figures. Furthermore, the laser driver 66 and laser diode 68 are also identical. Optical fiber 37 in FIG. 4 differs from optical fiber 37 in FIG. 1 in that it includes at least three separable sub-fibers that are joined together at a distal end located away from the three hydraulic cylinders and adjacent to the laser diode such that each of the three is positioned to gather a portion of the light generated by the laser diode. At the other end, each of the separable sub-fibers are separated and directed to each of three fiber optic connectors 39. The other end of these three optical fibers are held closely together and disposed in the optical path in front of laser diode 68. In this manner, laser light generated by laser diode 68 is transmitted into at least three fibers at once.

When laser diode 68 generates a pulse of light, that pulse is transmitted into each of the three optical fibers that are closely coupled to the laser diode. Since the three fibers are separated and connected to individual fiber optic connectors 39, the pulse of light travels down each of the three fibers through connectors 39, through each of three optical fibers 36 and into all three hydraulic actuators 10. The light pulses traverse cylinder 12, reflect off reflective surface 26 and return to optical couplers 34. Each of the individual fibers 38 for each of the couplers 34 receives a portion of the light, which is then merged at combiners 42. For each of the three cylinders, the reflected pulse of laser light then travels down optical fiber 44, through collimating lens assembly 46 and falls upon photodiode 48.

Thus, the light from laser diode 68 is received at three different photodiodes and three different photodiode amplifiers. Each pulse of light from laser diode 68 is therefore first divided into three separate optical fibers. The three pulses from these three fibers are reflected off a piston and the reflected pulses are then further sub-divided into two or more receiving optical fibers 38. For each actuator, the reflected optical pulses that are gathered by two or more individual fibers 38 are gathered together again and converted into a single optical pulse (with a greater amplitude than any of the three sub-divided pulses on fibers 38) and is applied to a corresponding photo diode amplifier 52' for that actuator.

The output of each photodiode amplifier 52' is joined to the other outputs, which are provided to pulse expansion circuit 54. The expanded pulse is then transmitted to phase comparator 56, which then provides the time-of-flight on line 60 for further processing.

In practical application, it is anticipated that each of the three actuators 10 will operate independently of the other. As a result, one piston may be very close to optical coupler 34 while another piston is far away. As time progresses, the two pistons may move towards one another, cross paths, and assume the opposite orientation, with the extended cylinder now retracted and the retracted cylinder now extended.

If pulse expansion circuit 54 simultaneously received signals from all three photodiode amplifiers whenever a pulse of light was generated by laser diode 68, it would become impossible for it to differentiate between the three cylinders. If the optical path lengths for the three cylinders were ever equal, due to movement of pistons 20, photodiode amplifiers 52 prime would transmit pulses at the same time. As the optical paths change their relative lengths, it would become impossible to determine, as they separated, which pulse received by pulse expansion circuit 54 corresponded to which cylinder.

For this reason, timing circuit 58' is equipped to not only generate simultaneous pulses on line 62 and 64 (the lines coupled to phase comparator circuit 56 and laser driver 66) respectively, but also to selectively enable a single photodiode amplifier 52' and disable the other photo diode amplifiers 52' using one or more of gate signals: gate 1, gate 2, or gate 3.

In the preferred embodiment, each of photodiode amplifiers 52' will not transmit a pulse to pulse expansion circuit 54 unless they receive a corresponding gate signal on their corresponding gate signal line. When they do not transmit a pulse, they are "disabled", and vice-versa. Thus, timing circuit 58' generates a gate pulse on one of the gate signal lines at substantially the same time as it generates the timing pulse on line 62 and 64. If the gate signal is transmitted on gate signal line "gate 1" then only the pulse of light returning from the top most cylinder in FIG. 4 will be transmitted by a photodiode amplifier to the pulse expansion circuit. The other two photodiode amplifiers 52', not receiving a gate signal, will not transmit a corresponding signal indicating that they received reflected light to pulse expansion circuit 54. In this manner, timing circuit 58' can selectively enable or disable a plurality of photodiode amplifiers, thereby preventing the transmission of one or more reflected light pulses in electrical form to pulse expansion circuit 54.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

What is claimed is:

1. A multiple cylinder position sensing system is provided comprising:

a first cylinder including:

a first source light guide having a first end and a distal second end and extending from inside the cylinder to outside the cylinder and adapted to transmit at least a first beam of laser light at a first frequency from outside the cylinder to inside the cylinder; and at least one first reflected light guide having a first end and a distal second end and extending from inside the cylinder to outside the cylinder and configured to receive light from the first beam of laser light that is reflected off the inside of the first cylinder;

a second cylinder including:

a second source light guide having a first end and a distal second end and extending from inside the cylinder to outside the cylinder and adapted to transmit at least a second beam of laser light at a first frequency from outside the cylinder to inside the cylinder; and at least one second reflected light guide having a first end and a second end and extending from inside the cylinder to outside the cylinder and configured to receive light from the second beam of laser light that is reflected off the inside of the second cylinder.

2. The system of claim 1, further comprising a laser light source that is optically coupled to the distal ends of both the first and second source light guides, and configured to generate a source beam of laser light, wherein the source beam is divided into the first and second beams of laser light.

3. The system of claim 2, further comprising a first photodiode configured to receive and electrically respond to light from the first beam of laser light that is reflected off the inside of the first cylinder from the first reflected light guide.

4. The system of claim 3, further comprising:

a laser light source driver circuit coupled to the laser light source and configured to energize the laser light source upon receipt of a trigger pulse; and a timing circuit coupled to the laser light source driver configured to generate the trigger pulse and apply the trigger pulse to the laser light source driver circuit.

5. The system of claim 4, wherein the laser light source is a laser diode.

6. The system of claim 5, further comprising first and second photodiode amplifiers that are coupled to the first and second photodiodes, respectively.

7. The system of claim 6, wherein each of the first and second photodiode amplifiers is configured to generate an output signal.

8. The system of claim 7, further comprising a pulse expansion circuit, wherein the first and second photodiode output signals are coupled to the pulse expansion circuit.

9. A method for determining the time-of-flight of laser light pulses in a plurality of hydraulic or pneumatic cylinders, the method including the steps of:

generating a first timing pulse in a timing circuit;

conducting the first timing pulse to a laser light source and responsively generating a first laser light pulse from the source;

conducting a first portion of the first laser light pulse through a first optical fiber to a first cylinder;

conducting the first portion of the first laser light pulse into the first cylinder;

reflecting the first portion off a first reflective surface coupled to a first piston in the first cylinder;

receiving the first portion of the first laser light pulse at a first photodiode and responsively generating a first electrical signal indicative of the time of arrival of the first portion of the first laser light pulse at the first photodiode;

conducting a second portion of the first laser light pulse through a second optical fiber to a second cylinder;

conducting the second portion of the first laser light pulse into the second cylinder;

reflecting the second portion of the first laser light pulse off a second reflective surface coupled to a second piston in the second cylinder;

receiving the second portion of the first laser light pulse at a second photodiode and suppressing the transmission of a second electrical signal indicative of the time of arrival of the second portion of the first laser light pulse at the second photodiode; and providing the first electrical signal and the first timing pulse to a comparator circuit and responsively generating a first output signal indicative of a first time difference between arrival of the first timing pulse and the arrival of the first electrical signal at the comparator circuit.

10. The method of claim 9, further comprising the steps of:

generating a second timing pulse in the timing circuit;

conducting the second timing pulse to the laser light source and responsively generating a second laser light pulse from the source;

conducting a first portion of the second laser light pulse through the first optical fiber to the first cylinder;

conducting the first portion of the second laser light pulse into the first cylinder;

reflecting the first portion of the second laser light pulse off the first reflective surface;

receiving the first portion of the second laser light pulse at the first photodiode and suppressing the generation of a third electrical signal indicative of the time of arrival of the first portion of the second laser light pulse at the first photodiode;

conducting a second portion of the second laser light pulse through the second optical fiber to the second cylinder;

conducting the second portion of the second laser light pulse into the second cylinder;

reflecting the second portion of the second laser light pulse off the second reflective surface;

receiving the second portion of the second laser light pulse at a second photodiode and responsively generating a fourth electrical signal indicative of the time of arrival of the second portion of the second laser light pulse at the second photodiode; and providing the fourth electrical signal and the second timing pulse to the comparator circuit and responsively generating a second output signal indicative of a second time difference between the arrival of the second timing pulse and the fourth electrical signal at the comparator circuit.

11. The method of claim 9, wherein the step of conducting the first timing pulse to the laser light source and responsively generating a second laser light pulse from the source includes the steps of:

optically coupling the laser light source to distal ends of the first and second optical fibers; and dividing the first laser light pulse into the first and second portions.

12. The method of claim 11, further comprising the steps of:

providing a laser light source driver circuit;

coupling the laser light source to the driver circuit;

applying the first and second timing pulses to the laser light source driver circuit; and energizing the laser light source responsive to the application of the first and second timing pulses to the driver circuit.

13. The method of claim 9, further comprising the steps of:

providing a first photodiode amplifier and coupling the first photodiode amplifier to the first photodiode;

providing a second photodiode amplifier and coupling the second photodiode amplifier to the second photodiode;

generating a first gate signal in the timing circuit;

applying the first gate signal to the first photodiode amplifier to permit the transmission of the first electrical signal;

generating a second gate signal in the timing circuit; and applying the second gate signal to the second photodiode amplifier to suppress the transmission of the second electrical signal.

14. The method of claim 13, further comprising the step of:

configuring the first and second photodiode amplifiers to generate first and second amplifier output signals, respectively.

15. The method of claim 14, further comprising the step of:

coupling the first and second photodiode amplifier output signals; and transmitting the coupled output signals to a pulse expansion circuit.

16. The method of claim 14, further comprising the step of:

transmitting the first and second output signals to a pulse expansion circuit.

17. The method of claim 16 further comprising the steps of:

generating an expanded pulse output signal in the pulse expansion circuit; and outputting the expanded pulse output signal from the pulse expansion circuit.

18. The method of claim 17, further comprising the steps of:

providing a pulse comparator circuit; and inputting the expanded pulse output signal and the timing pulse into the pulse comparator circuit; and generating a time delay output signal in the pulse comparator circuit indicative of a time delay between the timing pulse and the expanded pulse output signal.

19. A method of determining the time-of-flight of laser light in a plurality of hydraulic or pneumatic cylinders comprising the steps of:

transmitting a laser light pulse from a laser diode;

dividing the laser light pulse into at least first and second sub-pulses;

injecting the first and second sub-pulses into first and second cylinders, respectively;

reflecting the first and second sub-pulses off first and second pistons in the first and second cylinders, respectively;

receiving the first and second reflected sub-pulses to first and second photodiodes, respectively;

generating first and second electrical signals in the first and second photodiodes that are indicative of the first and second times of arrival of the first and second sub-pulses at the first and second photodiodes, respectively;

selectively coupling the first and second electrical signals in a first mode of operation to a pulse expansion circuit and a phase comparator circuit to generate a first time-of-flight signal on an output line of the phase comparator circuit that is indicative of the time-of-flight of the first sub-pulse and not of the second sub-pulse; and repeating the foregoing steps with a second pulse of laser light but in a second mode of operation wherein the phase comparator circuit generates a second time-of-flight signal on the output line that is indicative of the time-of-flight of the second sub-pulse and not of the first sub-pulse of the second pulse of laser light.

* * * * *